United States Patent [19]

DeBello

[11] Patent Number: 4,665,320

[45] Date of Patent: May 12, 1987

[54] EXTENDED LIFE STARTER MOTOR

[76] Inventor: Robert J. DeBello, 304 Saddle River Rd., Saddle Brook, N.J. 07662

[21] Appl. No.: 684,531

[22] Filed: Dec. 21, 1984

[51] Int. Cl.[4] .......................... F02N 11/08; H02P 9/04

[52] U.S. Cl. ........................................................ 290/48

[58] Field of Search ............................... 290/48, 38 R; 123/179 M, 179 R

[56] References Cited

U.S. PATENT DOCUMENTS

| | | | |
|---|---|---|---|
| 1,726,397 | 8/1929 | Lansing | 290/48 |
| 1,803,829 | 5/1931 | Apple | 290/48 |
| 2,204,573 | 4/1940 | Clouston | 290/48 |
| 2,293,830 | 7/1960 | Merriam, Jr. et al. | 290/38 R |
| 3,030,518 | 11/1962 | Jensen | 290/38 R |
| 3,084,561 | 4/1963 | Mattson | 290/38 R |
| 4,336,385 | 3/1982 | Williams | 290/38 R |
| 4,395,923 | 7/1983 | Glometti | 74/7 |

*Primary Examiner*—Michael L. Gellner
*Assistant Examiner*—Brian W. Brown
*Attorney, Agent, or Firm*—David A. Jackson

[57] ABSTRACT

A starter motor includes a housing; an armature shaft having front and rear opposite ends mounted in the housing; armature laminations mounted on the armature shaft; a field coil assembly for causing rotation of the armature shaft, the field coil assembly including three series-connected coils and a shunt coil, all positioned in the housing in surrounding relation to the armature laminations; an inertia style drive mounted on the armature shaft forward of the armature laminations and including a pinion gear for engaging with an engine flywheel during rotation of the armature shaft; a center plate connected to the housing and mounted on the armature shaft between the inertia style drive and the armature laminations; a first ball bearing assembly for mounting the center plate on the armature shaft; a second ball bearing assembly for mounting the front and/or rear ends of the armature shaft in the housing; an oil cap connected to the housing at the front end thereof for providing lubrication of the armature shaft on which the inertia style drive slides; and an elastic seal surrounding the inertia style drive in a light fitting relation and having its outer circumferential surface in sealing contact with the inner wall of the housing for preventing contaminants from contaminating the inertia style drive.

6 Claims, 5 Drawing Figures

EXTENDED LIFE STARTER MOTOR

BACKGROUND OF THE INVENTION

This invention relates generally to starter motors and, more particularly, is directed to an extended life starter motor for automotive vehicles.

Normal operation of automotive vehicles results in activation of the starter motor between two and four times each day. Assuming that a starter motor is activated three times each day for 350 days each year, and with an average lifetime of an original equipment starter motor being 7,500 starts, then an original equipment starter motor can expect to last for slightly greater than seven years before breaking down.

On the other hand, with high fleet start operations, such as the United Parcel Service, a starter motor may be activated approximately 135 times per day for five days per week. Based on the foregoing average lifetime of a starter motor being approximately 7,500 starts, it will be readily recognized that the starter motors used in high start fleet operations will on the average break down every two to three months. It is therefore desirable to provide an extended life starter motor for such high start fleet operations.

In a starter motor, the armature shaft is generally secured only at its ends within the starter motor housing, with the armature and commutator being positioned on the armature shaft toward the rear or commutator end thereof. Because the armature shaft is only secured at its ends, with the weight thereof being supported between the ends, there tends to be a flexing or bending of the shaft during rotation of the latter. Because of such flexing, the bushings in which the front and rear ends of the armature shaft are mounted within the housing quickly become worn. This is particularly true of the front bushing at the pinion end because the weight of the armature and commutator on the shaft is disposed toward the rear end thereof, whereby flexing is greater at the front portion of the armature shaft. As a result, the front bushing is one of the first elements to fail in a starter motor. In other words, the tolerance of the bushing becomes too wide or large, so that the drive for the starter motor may jam, causing the nose of the starter motor to tear, the shaft to break, failure of the ring gear or a combination of the above and other part failures of the starter motor.

It has therefore been proposed to utilize a center support secured to the housing and mounted on the armature shaft in front of the armature. The center support has been designed in certain applications to prevent flexing of the armature shaft. However, the center support is mounted on the armature shaft by means of a bushing. Because there is still some flexing of the armature shaft, the bushing which mounts the center support also becomes worn over time, whereby flexing of the armature shaft is not prevented after a period of time.

Another point of failure in starter motors is the solenoid-fork arrangement which biases the drive portion of the starter motor forward such that the pinion thereof engages with the engine flywheel to start the engine. More particularly, after a large number of starts, the fork tends to break, thereby rendering the starter motor useless.

U.S. Pat. No. 4,366,385 describes a starter motor of the inertia drive type which eliminates the solenoid-fork arrangement. Inertia style drives are well-known in the art, for example, as shown in U.S. Pat. No. 4,395,923. See also U.S. Pat. No. 2,204,573 for a starter motor having an inertia style drive.

With starter motors, it is desirable that the meshing of the pinion gear with the engine flywheel be as smooth as possible. It is therefore desirable that suitable lubrication be provided thereat for insuring such meshing engagement.

To effect lubrication therebetween, conventional front bushings have been provided with oil impregnated fibers. However, after an extended period of usage of the starter motor, particularly in high start fleet operations, the fiber tends to become depleted of oil. Conventional original equipment starter motors do not provide any means for relubricating the drive portion of the starter motor. An absence of sufficient lubrication may cause damage to and failure of the starter motor. It is therefore desirable that some means be provided for providing periodic lubrication of the starter motor.

Related to the latter aspect, it is to be appreciated that the starter motor housing is open at the drive end thereof to permit the pinion gear to engage the engine flywheel so as to start the internal combustion engine. As a result, engine dust, sand and the like may enter the starter motor housing at the drive end thereof. Such dust, sand and the like entering the housing interferes with the starter drive and causes failure of the starter motor. This, of course, is another source of failure of conventional original equipment starter motors.

Lastly, with conventional original equipment starters, four series connected coils are used for causing rotation of the armature shaft. The four coils, however, result in the armature shaft spinning at a speed greater than that necessary, for an inertia style drive, to spin the starter drive forward such that the pinion engages the engine flywheel. A problem with such arrangement is that the starter drive tends to impact against the forward part of the housing with a relatively large force, resulting in failure of the starter motor therefrom over a period of time. The four coils are provided in order to provide the necessary torque for starting the engine. It is therefore desirable to provide an arrangement of coils in which the engine torque is maintained, while also reducing the speed of the armature shaft.

U.S. Pat. Nos. 2,923,830 and 3,030,518 disclose a starter motor for the solenoid-fork arrangement in which three series coils are used along with a shunt or holding coil. The provision of the shunt or holding coil in such patents, however, is to hold the plunger in the opening against the frame to keep the starter engaged during normal operating load or speed of the armature, which would otherwise not occur merely with the series coils, which may have their current reduced when the engine has commenced running. A coil arrangement which utilizes three series coils and a shunt coil is also sold by Ace Electric Company of Columbus, Kansas.

OBJECTS AND SUMMARY OF THE INVENTION

Accordingly, it is an object of the present invention to provide a starter motor for an internal combustion engine that avoids the aforementioned deficiencies.

More particularly, it is an object of the present invention to provide a starter motor for an internal combustion engine with an extended wear life.

It is another object of the present invention to provide an extended life starter motor for an internal combustion engine which utilizes an inertia style drive.

It is still another object of the present invention to provide an extended life starter motor for an internal combustion engine that permits for periodic lubrication of the drive portion therof.

It is yet another object of the present invention to provide an extended life starter motor for an internal combustion engine that avoids the problem of wear of the mountings for the armature shaft caused by flexing of the latter.

It is a further object of the present invention to provide an extended life starter motor for an internal combustion engine that prevents dust, sand and the like from adversely effecting the starter drive thereof.

It is a still further object of the present invention to provide an extended life starter motor for an internal combustion engine which reduces the speed of the armature shaft while maintaining the high torque of the starter motor.

In accordance with an aspect of the present invention, a starter motor comprises a housing; an armature shaft having opposite ends mounted in the housing; armature means mounted on the armature shaft; coil means for causing rotation of the armature shaft, the coil means including a plurality of coils connected in series and a shunt coil, all positioned in proximity to the armature means; an inertia style drive mounted on the armature shaft and including a pinion gear for engaging with an engine flywheel during rotation of the armature shaft; a center plate connected to the housing and mounted on the armature shaft between the inertia style drive and the armature means; and a bearing assembly for mounting the center plate on the armature shaft.

In accordance with another aspect of the present invention, a starter motor comprises a housing; an armature shaft having opposite ends mounted in the housing; armature means mounted on the armature shaft; coils means for causing rotation of the armature shaft, the coil means including a plurality of coils connected in series and a shunt coil, all positioned in proximity to the armature means; an inertia style drive mounted on the armature shaft and including a pinion gear for engaging with an engine flywheel during rotation of the armature shaft; a center plate connected to the housing and mounted on the armature shaft between the inertia style drive and the armature means; a first bearing assembly for mounting the center plate on the armature shaft; a second bearing assembly for mounting at least one of the opposite ends of the armature shaft in the housing; lubricating means connected to the housing for permitting lubrication of the armature shaft on which the inertia style drive slides; and elastic seal means positioned between the inertia style drive and the housing to prevent entry of contaminants into the start motor.

The above, and other, objects, features and advantages of the present invention will become readily apparent from the following detailed description thereof which is to be read in connection with the accompanying drawings.

DETAILED DESCRIPTION OF A PREFERRED EMBODIMENT

Figure 1:
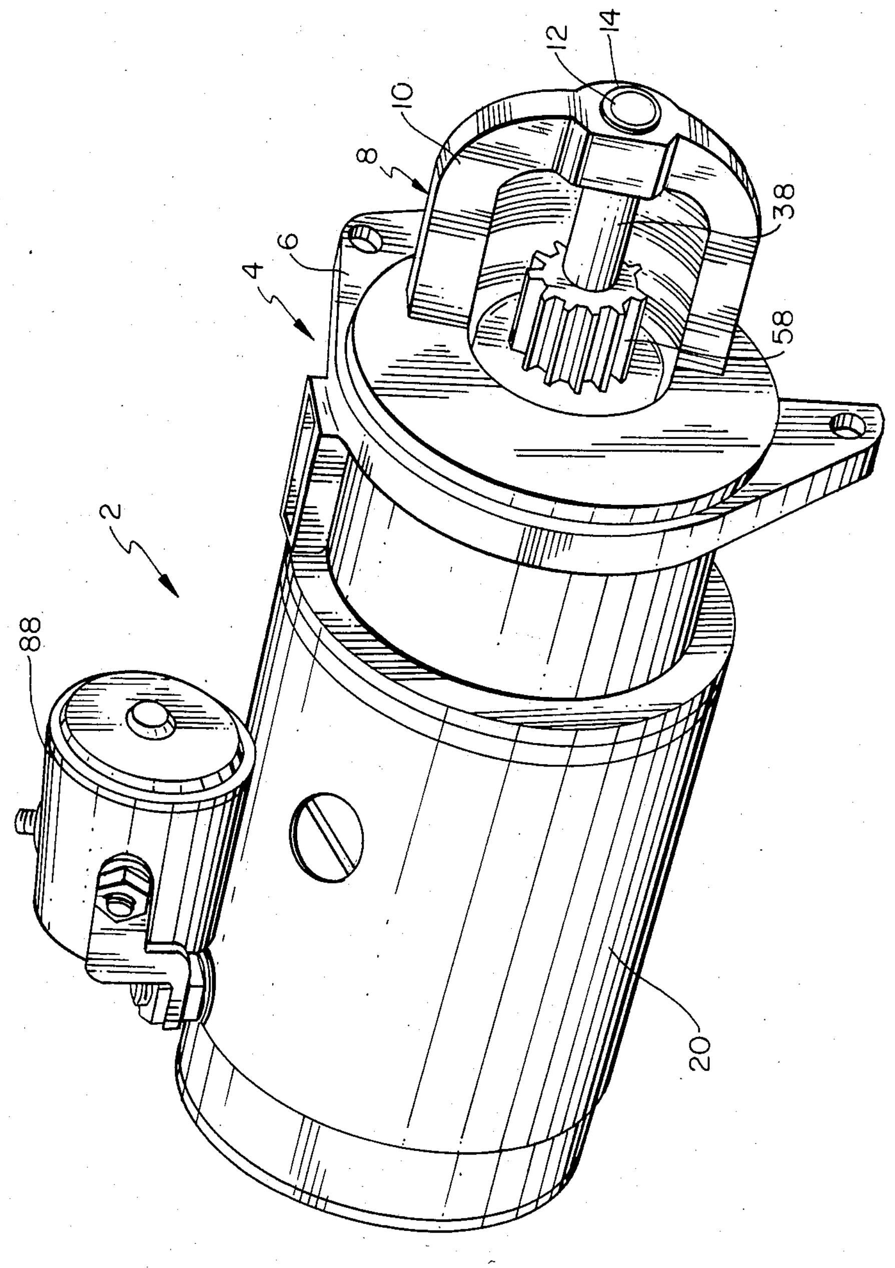
FIG. 1 is a perspective view of an extended life starter motor according to one embodiment of the present invention.
Figure 2:
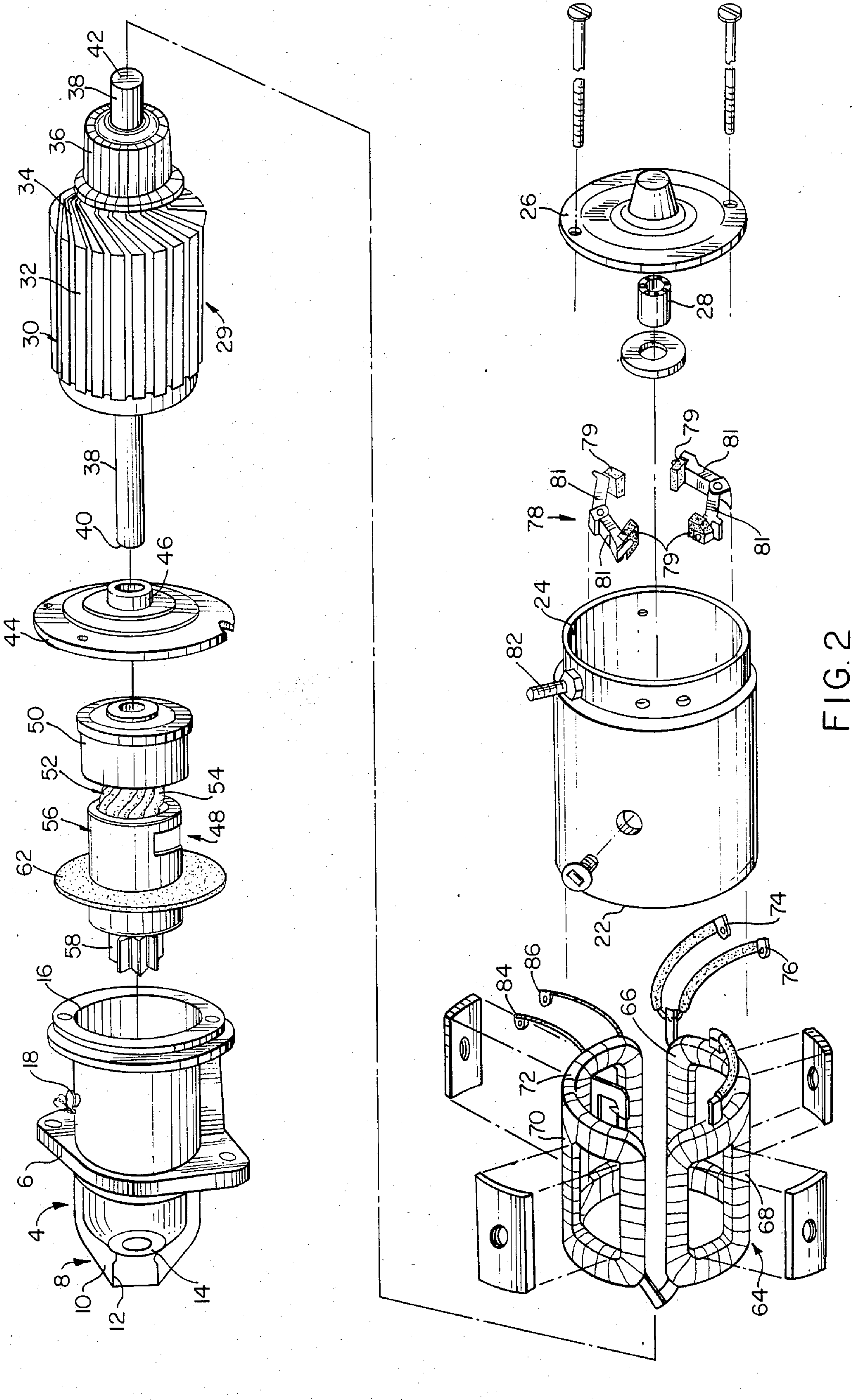
FIG. 2 is an exploded, perspective view of the starter motor of FIG. 1.

Referring to the drawings in detail, and initially to FIGS. 1 and 2 thereof, a starter motor 2 according to one embodiment of the present invention includes a drive end housing 4 having an exterior flange 6 by which the drive end housing 4 is secured to the engine. As is conventional, the front end or nose 8 of drive end housing 4 is tapered toward the distal end thereof and is cut away, as at 10, to expose the inside of drive end housing 4, whereby the pinion gear of the starter motor, as will be discussed in greater detail hereinafter, can engage the engine flywheel for starting the internal combustion engine. Nose 8 includes at its distal point an aperture 12 within which is positioned a bushing 14, as is also well-known in the art. In accordance with the present invention, however, bushing 14 can be replaced with a bearing assembly. The opposite end of drive end housing 4 is open, as at 16.

In accordance with a first aspect of the present invention, an oil cap 18 is provided on drive end housing 4 so as to permit periodic lubrication of the area of the armature shaft on which the drive slides. Preferably, a non-congealing oil is used for such lubrication.

A field housing 20 is also provided and is generally cylindrical in configuration, having first and second opposite open ends 22 and 24. First open end 22 is secured to open end 16 of drive and housing 4 and second open end 24 at the rear end of starter motor 2 is closed by an end plate 26. In accordance with another apsect of the present invention, end plate 26 has a central ball bearing 28 mounted thereon for supporting the rear end of the armature shaft.

An armature assembly 29 includes an armature 30 having lengthwise laminations 32, as is conventional, and pins 34 running through armature 30 and which are connected to a commutator 36, both armature 30 and commutator 36 being coaxially fixed on an armature shaft 38 toward the rear end thereof, that is, offset to the rear of armature shaft 38. Armature shaft 38 has its front end 40 mounted within bushing 14 of drive end housing 4, while rear end 42 of armature shaft 38 is mounted within central bearing 28 in end plate 26.

It will be appreciated that, during rotation of armature assembly 29, including aramture shaft 38, because armature shaft 38 is only supported at its opposite ends 40 and 42, and since armature 30 and commutator 36 are mounted between the opposite ends and slightly to the rear thereof, there will be a flexing or bending of armature shaft 38 during rotation thereof. The use of a bearing 28, and possibly a bearing in place of bushing 14, will, of course, extend the life of the starter motor since there will be no wear of bushings. However, it becomes difficult, because of space problems, to utilize a bearing in place of bushing 14.

Figure 3:
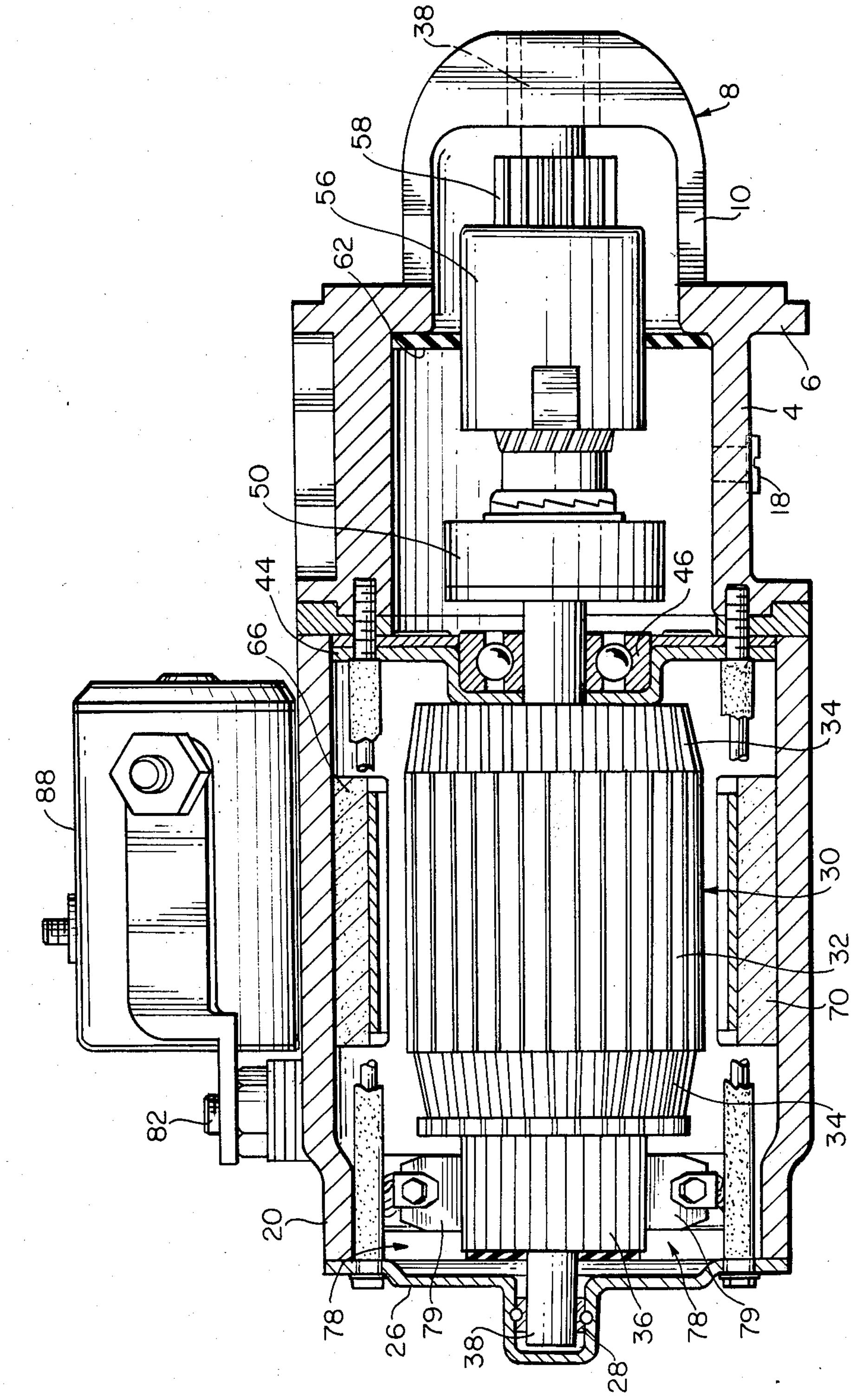
FIG. 3 is a side elevational view, partly broken away and partly in cross-section, of the starter motor of FIG. 1.

Accordingly, it has been proposed to utilize a center plate 44 mounted on armature shaft 38 adjacent to, armature 30 to prevent or minimize such flexing. Center plate 44 can be connected to drive end housing 4 and/or field housing 20, and is preferably shown in FIG. 3 having its outer circumferential edge connected between drive end housing 4 and field housing 20. In accordance with known starter motors, center plate 44 is generally mounted on armature shaft 38 by means of a central bushing. However, continued rotation and slight flexing of armature shaft 38 results in wear of such bushing so that use of center plate 44 is effectively defeated.

In accordance with the present invention, center plate 44 is mounted on armature shaft 38 by means of a sealed ball bearing 46. It has been found through tests that the wear on the drive end bushing 14 with this arrangement is approximately 0.001 inches after 50,000 starts of starter motor 2. Since drive end bushing 14 is one of the first elements of starter motor 2 to fail, it will be appreciated that the starter motor according to the present invention enjoys an extended life.

Because failure of the solenoid-fork arrangement of conventional starter motors is common after extended usage, in accordance with the present invention, an inertia style drive 48 is mounted on armature shaft 38 in front of center plate 44 and is of the type generally described in U.S. Pat. No. 4,395,923, the disclosure of which is incorporated herein by reference. Accordingly, inertia style drive 48 includes a sleeve 50 which is secured on armature shaft 38 directly in front of center plate 44, a hollow screw shaft 52 having helical threads 54 at least along a portion thereof and a driving clutch section 56 mounted on drive shaft 52 and displaceable along armature shaft 38 and screw shaft 52 with respect to sleeve 50. Clutch section 56 includes a pinion gear 58 at the forward end thereof, as is conventional, which engages with the engine flywheel (not shown) for starting the engine.

Generally, when armature shaft 38 is rotated at or greater than a predetermined speed in a first driving direction, clutch section 56, by means of inertia, is caused to rotate along helical threads 54 into cut-away section 10 of drive end housing 4 such that pinion gear 58 engages with the engine flywheel to start the engine. Once the engine has been started and reaches a predetermined speed, clutch section 56 is biased back to its original position out of engagement with the engine flywheel, as taught in U.S. Pat. No. 4,395,923. Because the starter drive is relatively simple and does not utilize a solenoid-fork arrangement, the life of starter motor 2 is extended.

Further, with oil cap 18, the drive end of armature shaft 38 and drive end bushing 14 can be lubricated, thereby resulting in lubrication of the area of the armature shaft on which the drive slides. As previously discussed, a non-congealing oil should preferably be used. Generally, it is preferable to oil starter motor 2 after approximately every 15,000 starts. Assuming, as discussed before, 135 starts per day with five days of operation per week, this would result in relubrication of starter motor 2 for high start fleet operations approximately every six months.

In some areas where an automotive vehicle is used, there is a high sand content. Since it is desirable to prevent sand, engine dust and the like from entering drive end housing 4 through cut away section 10 thereof, because such contamination will result in failure of inertia style drive 48, an elastic seal 62 made from rubber or like material, is secured around clutch section 56 in a tight fitting relation and has its outer circumferential end surface in sealing contact with the inner surface of drive end housing 4 to provide a seal which prevents contaminants from entering into drive end housing 4 at the rear portion of inertia style drive 48.

Figure 5:
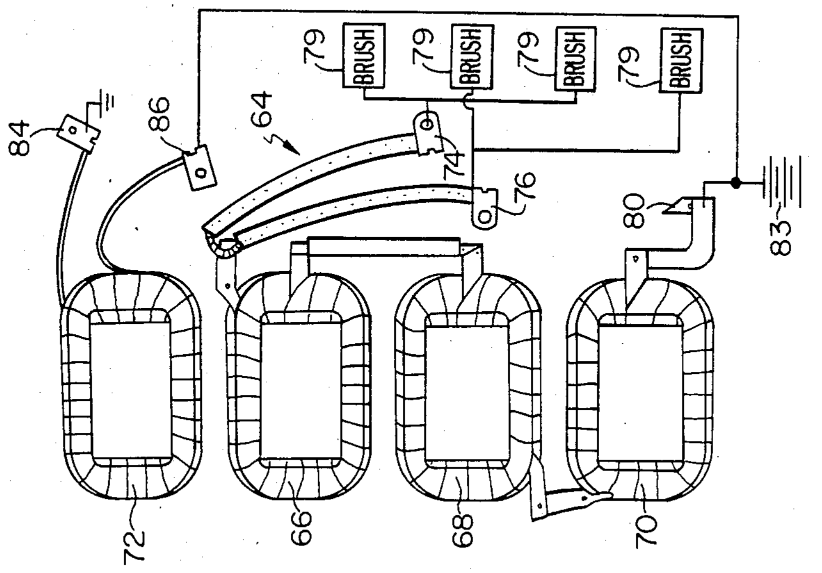
FIG. 5 is a plan view of the coil arrangement used with the starter motor of FIG. 1.

Referring now to FIGS. 2 and 5, a field coil arrangement 64 mounted on the inner wall of field housing 20 in surrounding relation to armature 30 includes three series-connected field coils 66, 68 and 70 and a shunt coil 72. More particularly, field coil 66 includes three terminals 74 and 76 connected to the brush arrangement 78 of starter motor 2, which includes four brushes 79 connected within field housing 20 and held in surrounding and spring-biased contacting relation with commutator 36 by spring members 81, as is well known in the art. The free terminal 80 of coil 70 is connected to the main power stud 82 extending through field housing 20 and which is supplied with power from the battery 83 of the automotive vehicle. The free terminals 84 and 86 of shunt coil 72 are connected to ground and main power stud 82 respectively.

As previously discussed, with four series coils, the armature shaft tends to rotate at an excessively high speed, thereby causing pinion 58 to bang into the front end of drive end housing 4, thereby reducing the life of the starter motor. In accordance with the present invention, the use of three series-connected coils 66, 68 and 70, along with a fourth shunt coil 72, slows down armature shaft 38, while maintaining the same high torque necessary for operation. As a result, pinion gear 58 does not impact into the front end of drive end housing 4 and thereby does not cause failure of the starter motor.

Figure 4:
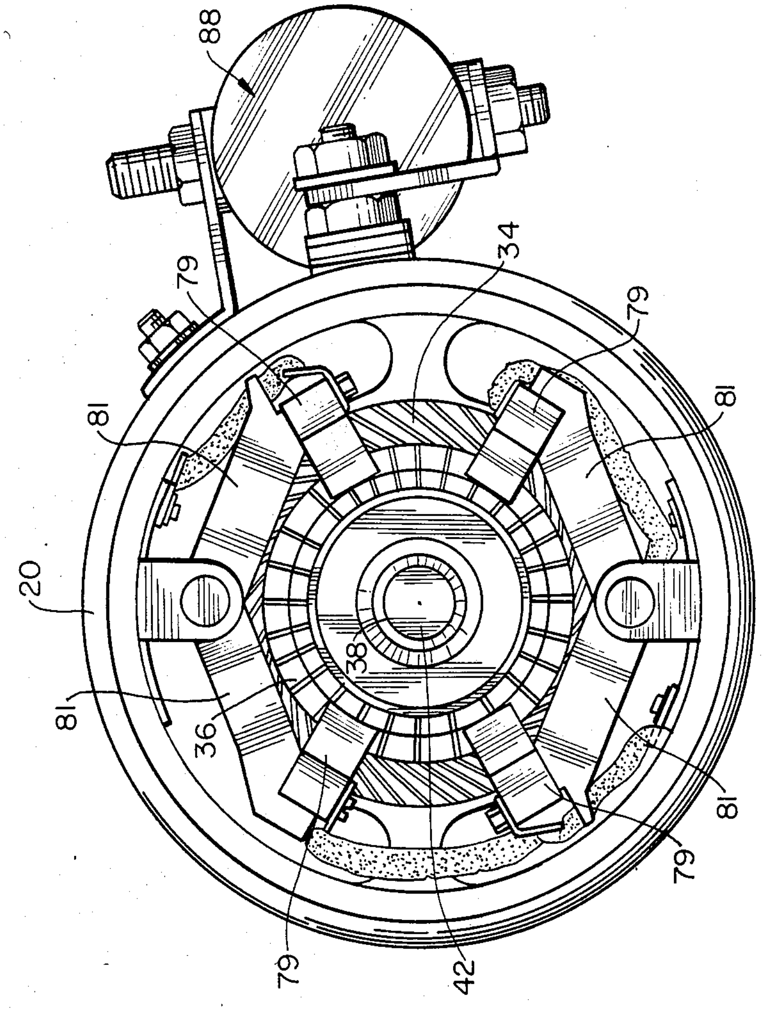
FIG. 4 is an end plan view of the starter motor of FIG. 1, with the end plate thereof removed.

Lastly, as is conventional in the art, a solenoid 88, as shown in FIGS. 1 and 4, is connected to power stud 82 on the exterior of field housing 20 and functions as a switch for energizing the starter. The solenoid thereby effectively functions as an ON/OFF switch. Because there is reduced wiring, there is no or little amperage loss.

It will be appreciated that, with the above described arrangement, the life of starter motor 2 is greatly increased over that of conventional starter motors. In tests performed with an original equipment starter motor, and an original equipment starter motor modified in accordance with the present invention, it was found that starter motor 2 according to the present invention had a greatly extended life. For example, for a conventional starter motor for use with a 1984 Ford vehicle having a 4.5 liter, 6 cylinder engine, it was found that the new original equipment starter motor for use with the vehicle failed after 6,872 starts, while a starter motor in accordance with the present invention failed after 67,303 starts. Each starter was tested through a seven second engagement, start, run and shut-down cycle until the unit failed.

Having described a specific preferred embodiment of the invention with reference to the accompanying drawings, it is to be understood that the present invention is not limited to that precise embodiment, and that various changes and modifications may be effected therein by one of ordinary skill in the art without departing from the scope and spirit of the invention as defined by the appended claims.

What is claimed is:

1. A starter motor comprising:

a housing;

an armature shaft having front and rear opposite ends mounted in said housing;

armature means mounted on the armature shaft;

coil means for causing rotation of said armature shaft, said coil means including a plurality of coils connected in series and a shunt coil, all positioned in proximity to said armature means;

an inertia style drive including a clutch section slidably mounted along said armature shaft and a pinion gear slidably with said clutch section for engaging with an engine flywheel during rotation of said armature shaft;

a center plate connected to said housing and mounted on said armature shaft between said inertia style drive and said armature means;

said housing having an inner wall, and said inner wall and said center plate defining an enclosure which houses said inertia style drive, said enclosure being open at a front end thereof;

a first ball bearing assembly for mounting said center plate on said armature shaft;

a second ball bearing assembly for mounting the rear end of the armature shaft within said housing; and elastic seal means secured around said clutch section of said inertia style drive and having an outer peripheral surface in sealing contact with said inner wall of said housing at said front end thereof for closing said front end of said enclosure to prevent contaminants from entering into said starter motor.

2. A starter motor according to claim 1; further including a bushing for mounting the front end of said armature shaft in said housing.

3. A starter motor according to claim 1; wherein said elastic seal means is made of rubber.

4. A starter motor according to claim 1; wherein said coil means includes three series-connected coils and a shunt coil mounted within said housing in surrounding relation to said armature means.

5. A starter motor comprising:

a housing;

an armature shaft having front and rear opposite ends mounted in said housing;

armature means mounted on the armature shaft;

coil means for causing rotation of said armature shaft, said coil means including a plurality of coils connected in series and a shunt coil, all positioned in proximity to said armature means;

an inertia style drive including a clutch section slidably mounted along said armature shaft and a pinion gear slidable with said clutch section for engaging with an engine flywheel during rotation of said armature shaft;

a center plate connected to said housing and mounted on said armature shaft between said inertia style drive and said armature means;

said housing having an inner wall, and said inner wall and said center plate defining an enclosure which houses said inertia style drive, said enclosure being open at a front end thereof:

a first ball bearing assembly for mounting said center plate on said armature shaft;

a second ball bearing assembly for mounting at least one of said front and rear opposite ends of said armature shaft in said housing;

means connected to said housing at a position corresponding to a portion of said shaft on which said inertia style drive slides for permitting relubrication of the armature shaft at a position on which said inertia style drive slides; and elastic seal means secured around said clutch section of said inertia style drive and having an outer peripheral surface in sealing contact with said inner wall of said housing at said front end thereof for closing said front end of said enclosure to prevent contaminants from entering intso said starter motor.

6. A starter motor according to claim 5; wherein said means for permitting relubrication includes an oil cap connected to said housing at the front end thereof for permitting lubrication of said armature shaft on which said inertia style drive slides.

* * * * *